United States Patent Office 3,468,879
Patented Sept. 23, 1969

3,468,879
ANTHRAQUINONE DYESTUFFS AND PROCESSES FOR THEIR PRODUCTION
Wolfgang Harms, Leverkusen, Klaus von Oertzen, Cologne-Stammheim, Hans-Samuel Bein, Burscheid, and Edgar Siegel, Leverkusen, Germany, assignors to Farbenfabriken Bayer Aktiengesellschaft, Leverkusen, Germany, a corporation of Germany
No Drawing. Filed Apr. 11, 1966, Ser. No. 541,486
Claims priority, application Germany, Apr. 14, 1965, F 45,813
Int. Cl. C09b 1/24, 1/22; C07d 51/78
U.S. Cl. 260—239.7          7 Claims

ABSTRACT OF THE DISCLOSURE

Anthraquinone dyestuffs of the formula

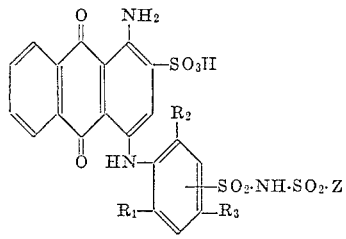

wherein $R_1$ stands for lower alkyl having 1 to 4 carbon atoms or halogen, $R_2$ is a lower alkyl having 1 to 4 carbon atoms, $R_3$ stands for hydrogen or lower alkyl having 1 to 4 carbon atoms and Z stands for a 5- or 6-membered heterocyclic ring which contains at least one mobile substituent or Z stands for a group containing a 5- or 6-membered ring having at least one mobile substituent or Z stands for an aliphatic, araliphatic or aromatic radical containing at least one reactive substituent or one reactive group.

---

The invention relates to new anthraquinone dyestuffs of the general formula

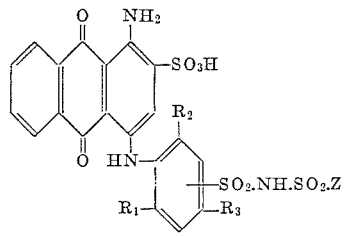
(I)

in which $R_1$ denotes an alkyl radical containing 1–4 carbon atoms, preferably $CH_3$— or $C_2H_5$—, or a halogen atom, preferably Br or Cl, $R_2$ is an alkyl radical containing 1–4 carbon atoms, preferably $CH_3$—, or $C_2H_5$—, $R_3$ is hydrogen or an alkyl radical, preferably $CH_3$— or $C_2H_5$—, Z stands for a 5- or 6-membered heterocyclic ring which carries at least one mobile substituent, or for a group containing a 5- or 6-membered heterocyclic ring which carries at least one mobile substituent; or Z stands for an aliphatic, araliphatic or aromatic radical with at least one reactive substituent or one reactive group.

Suitable mobile (reactive) substituents are mainly halogen atoms, such as Cl or Br, alkylsulphone, aralkylsulphone, araylsulphone, alkyloxy, aryloxy, alkylmercapto, ammonium, hydrazinium groups and sulphonic acid groups which can be split off.

Suitable heterocyclic radicals Z are, for example: 2-chlorothiazol-1,3-yl-4, 2-chlorothiazol - 1,3 - yl-5, 2,4-dichloropyrimidin-1,3-yl-5, 2-chlorobenzothiazol-1,3-yl-5 or -yl-6, 2-chlorobenzoxazol-1,3-yl-5 or -yl-6, 2,3-dichloroquinoxalin-yl-6, 2,4-dichloroquinazolin-yl-6 or -7, 1,4-dichlorophthalazin-yl-6, 2-, 3- or 4-(4',5'-dichloropyridazon-6'-yl-1')-phenyl.

Suitable aromatic radicals Z are, for example, 4-fluoro-3-nitrophenyl-1 or 4-chloro-3-nitrophenyl-1.

Suitable aliphatic or araliphatic radicals Z with at least one reactive group or one reactive substituent are, for example, —$CH_2$—$CH_2$—Cl, —CH=$CH_2$, $CH_2$—$CH_2$—O—$SO_3H$, —$CH_2$—$CH_2$—$SO_2$—$CH_3$, —$CH_2$—$CH_2$—O—$SO_2$—$CH_3$ or

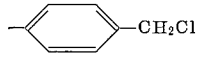

The new dyestuffs are prepared in known manner by condensation of suitable starting components, for example, by condensing anthraquinone-sulphonamides of the formula

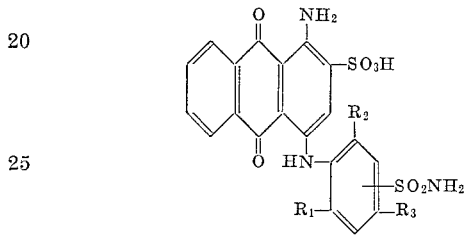
(II)

in which $R_1$, $R_2$ and $R_3$ have the meaning stated above, with sulphonic acid halides of the formula

   (III)

in which Z has the meaning stated above and "hal" stands for a halogen atom, preferably for —Cl or —Br.

This reaction is expediently carried out in an aqueous or aqueous-organic medium. The anthraquinone-sulphonamide component is expediently first dissolved, and the pH value required for the subsequent reaction with the sulphonic acid halide can be adjusted during this operation. The pH value and temperature of the subsequent condensation of the anthraquinone sulphonamide with the compound (III) may be varied, but it is expedient to work above 20° C. and at a pH value above 8.5.

In particular, the process can be carried out by adding the component (III) in powdered form or in the form of an aqueous suspension and, if necessary, also a water-immiscible organic solvent, such as benzene or chlorobenzene, to a solution of the anthraquinone component (II). Alternatively, the component (III) can be dissolved in an inert organic solvent, such as acetone, dioxan or benzene, and this solution added dropwise. The pH value most advantageous for the condensation is maintained by the dropwise addition of alkaline agents, such as a sodium hydroxide solution, potassium hydroxide solution or sodium carbonate solution.

Advantageous conditions for the reaction are, for example, a temperature of about 50° C. and a pH value in the range from 9 to 10. The conditions of temperature and pH must be so controlled that the reactive component (III) is not destroyed and thus rendered useless for the reaction.

In the course of the condensation between the components (II) and (III) the dyestuffs usually becomes more readily soluble. The completion of the reaction can easily be recognised by the reduced consumption of alkaline agents. When the condensation is completed, any impurities which may be present are filtered off. The resultant dyestuff solution can immediately serve for further application, for example for the dyeing or printing of textile materials. In general, however, the dyestuff is separated from the reaction solution by salting out after neutralisation, and isolated in the usual manner.

The starting compounds of the Formula II required for the reaction are obtained by conventional methods from the corresponding external sulphonic acid halides by condensation with ammonia. The introduction of the sulphonic acid halide group into the external nucleus is carried out, for example, by treatment with chlorosulphonic acid or with chlorosulphonic acid and thionyl chloride.

Sulphonic acid halides of the Formula III suitable for the reaction according to the invention with anthraquinone-sulphonamides of the Formula II are, for example, the following compounds: 2,3-dichloro-quinoxaline-6-sulphonic acid chloride, 2,3-dichloro-7-methyl-quinoxaline-6-sulphonic acid chloride, 2,3-dibromo-quinoxaline-6-sulphonic acid bromide, 1,4-dichloro-phthalazine-6-sulphonic acid chloride and the corresponding bromine compound, 2-chlorobenzothiazole-5- or -6- sulphonic acid chloride and the corresponding bromine compounds, 1-chloromethylbenzene-4-sulphonic acid chloride, vinyl-sulphonic acid chloride, 2-chloroethane-sulphonic acid chloride, 1-(chlorosulphonyl - phenyl) - 4,5-dichloro-pyridazone-6,2-chlorobenzoxazole-5- or -6-sulphonic acid chloride, 2-chloro-thiazole-4- or -5-sulphonic acid chloride and 4-fluoro-3-nitrobenzene-sulphochloride-1.

According to a modification of the process of the invention the new dyestuffs can also be synthesized by condensing a sulphonic acid halide of the formula

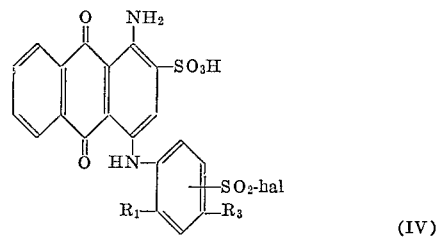

(IV)

in which $R_1$, $R_2$, $R_3$ and "hal" have the meaning stated above, with an amide of the formula $$H_2N-O_2S-Z \quad (V)$$

in which Z has the meaning stated above.

The reaction conditions are, in principle, analogous to those of the reaction described above, but the sequence is reversed.

Finally, some of the new dyestuffs can also be obtained by condensing 1 - amino - 4-bromo-anthraquinone-2-sulphonic acid with an amino compound of the formula

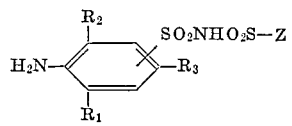

in which $R_1$, $R_2$, $R_3$ and Z have the meaning stated above.

The dyestuffs which can be obtained according to the invention are new. They are eminently suitable as reactive dyestuffs for the dyeing and printing of cellulose-containing materials, such as natural and regenerated cellulose, by the methods known for this purpose, for example the cold bath pad process, pad-steam process, pad-thermofixing process and for dyeing from a long bath. In general, the operation is carried out in the presence of alkaline agents.

The new dyestuffs are also suitable for the dyeing of materials containing amide groups, such as wool, silk and synthetic superpolyamides.

Especially on cellulose-containing textile materials the new dyestuffs yield extremely valuable dyeings and prints which are characterised by brilliant reddish blue shades and very good fastness properties particularly very good fastness to wet processing.

In the following examples which are given for the purpose of illustrating the invention, the parts stand for parts by weight; the temperatures are given in degrees centigrade.

Example 1

(A) 70 parts 1 - amino - 4 - (2',6'-dimethyl)-phenylamino-anthraquinone-2-sulphonic acid (sodium salt) are dissolved at 15–20° in 350 parts chlorosulphonic acid and the mixture is kept at 20–25°, until starting material is no longer present. After the addition of 115 parts thionyl chloride, the reaction mixture is heated at 25–30° for 30 minutes to one hour. When the solution has cooled to 20°, it is allowed to run into a stirred mixture of 2000 parts ice and 120 parts concentrated hydrochloric acid, the resultant precipitate is filtered off with suction, washed with 800 parts of ice-cold 10% sodium chloride solution and the paste so obtained is stirred at 20° into 350 parts concentrated ammonia. Stirring is continued at this temperature for 16 hours. The resultant reddish blue solution is poured with stirring into a mixture of 700 parts ice and 300 parts concentrated hydrochloric acid, the precipitate formed is filtered off with suction, washed with 900–1000 parts of a 10% sodium chloride solution and dried at 90°.

(B) 83 parts of the mixture of 1-amino-4-(2',6'-dimethyl-3'-sulphamido) - phenylamino - anthraquinone - 2-sulphonic acid and the corresponding 4'-sulphonamido compound obtained according to (A) are dissolved at 50° in 1000 parts water. The solution is adjusted to a pH value of 9–10 by means of a diluted sodium hydroxide solution, 56.5 parts 2,3-dichloroquinoxaline-6-sulphochloride and 2 ml. chlorobenzene are added to the solution and the above pH value is maintained by the dropwise addition of a 1 N sodium hydroxide solution.

When the reaction is completed, the chlorobenzene is driven off by introducing a vigorous air current, the dyestuff solution is filtered off from a small amount of undissolved material while still hot, cooled to 20° and adjusted to a pH value of 7 by the addition of dilute hydrochloric acid.

The solution is added dropwise to 1760 parts of a saturated sodium chloride solution and 370 parts sodium chloride are simultaneously introduced at the same rate as the dyestuff solution is added. The precipitated dyestuff is filtered off with suction and dried in a vacuum at 20° or in a circulating air drying cabinet at 50°. The dyestuff corresponds to the formulae

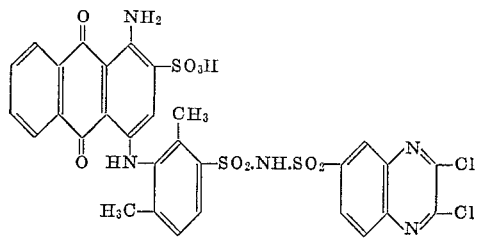

and

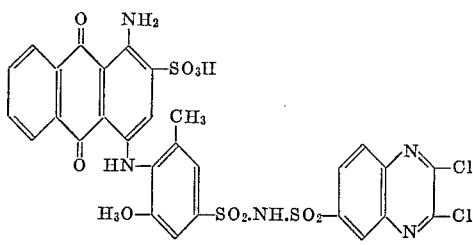

(C) Dyeing according to the padding process.—3 parts of the dyestuff of Example 1(B) are well pasted with 2 parts water at 20–25° and dissolved with 68 parts water at 20°. 30 parts of a 10% sodium carbonate solution are added to this solution. With the padding liquor thus obtained 20 parts of a cotton fabric are padded on a foulard, the rollers of which are pressed against one another with a sufficient pressure that the liquor absorption of the cotton fabric amounts to 80% of its dry weight. The fabric thus padded is rolled up and stored at 25° for 24 hours in such a manner that the moisture does not evaporate from the fabric. The dyed material is then thoroughly rinsed first with cold water and then with warm water, until the rinsing liquid is no longer coloured. The dyed material is subsequently soaped at boiling temperature for 20 minutes in a liquor containing 0.6 part sodium alkylsulphonate, rinsed again and dried. A brilliant reddish blue dyeing is obtained.

Fixation can also be carried out in that the fabric padded in the manner described above is dried at 60–70° and then either steamed at 102° for 5 minutes or treated in a drying cabinet at 140° for 8 minutes.

Example 2

(A) 25 parts of a mixture of 1-amino-4-(2′-methyl-6′ - ethyl - 3′ - sulphamido)-phenylamino-anthraquinone-2-sulphonic acid and the corresponding 4′-sulphamido compound [prepared in analogy with Example 1(A)] are dissolved at 50° in 300 parts water. The solution is adjusted to a pH value of 9–10 with a dilute sodium hydroxide solution, 22.5 parts 2,3-dichloro-quinoxaline-6-sulphochloride and 2 ml. chlorobenzene are added to the solution and the above pH value is maintained by the dropwise addition of a 1 N sodium hydroxide solution.

When the reaction is completed, the chlorobenzene is driven off by introducing a vigorous air current into the dyestuff solution, the hot solution is filtered off from a small amount of undissolved material, cooled to 20° and adjusted to pH 7 by the addition of dilute hydrochloric acid. The dyestuff solution is added dropwise to 570 parts of a saturated sodium chloride solution and 120 parts sodium chloride are simultaneously introduced to the resultant dyestuff suspension at the same rate as the dyestuff solution is added. The precipitated dyestuff is filtered off with suction and dried at 20° in a vacuum. The dyestuff corresponds to the formulae

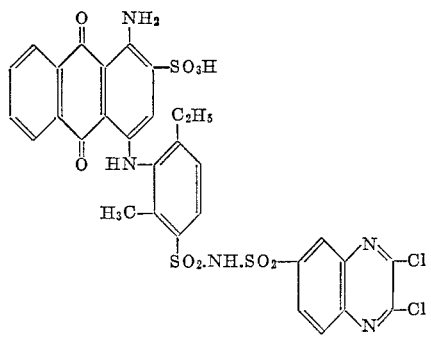

and

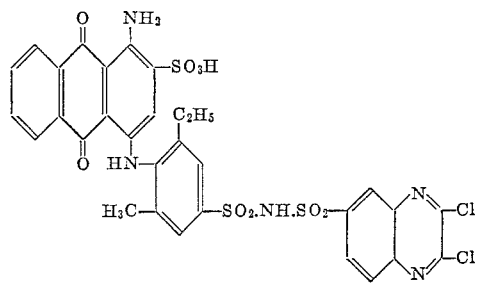

(B) Dyeing from a long bath.—0.3 part of the dyestuff of Example 2(A) is pasted with 2 parts water and 30 parts water at 70° are added. The dyestuff solution is diluted with 168 parts water at 20–25°. 10 parts cotton yarn are kept in constant motion in this dyebath, the temperature of the bath is raised to 40° within 10 minutes, 10 parts anhydrous sodium sulphate are added and dyeing is continued for 30 minutes. 4 parts sodium carbonate are then added to the dyebath and dyeing is continued at 40° for 60 minutes. The dyed material is first thoroughly rinsed with cold water and then hot water until the rinsing liquor is no longer coloured. The dyed material is subsequently soaped at boiling temperature for 20 minutes in 200 parts of a liquor containing 0.2 part sodium alkylsulphonate, rinsed again and dried. A brilliant reddish blue dyeing is obtained.

Example 3

(A) 29 parts 1-amino-4-(4′-methyl-2′,6′-diethyl-3′-sulphamido)-phenylamino-anthraquinone-2-sulphonic acid [obtainable in analogy with Example 1(A)] are dissolved at 50° in 750 parts water. The solution is adjusted to pH 9–10 with a dilute sodium hydroxide solution, 30 parts 2,3-dichloro-quinoxaline-6-sulphochloride and 2 ml. chlorobenzene are added to the solution and the stated pH value is maintained by the dropwise addition of a 1 N sodium hydroxide solution.

When the reaction is completed, the chlorobenzene is driven off by introducing a vigorous air current into the hot solution, the dyestuff solution is filtered off from a small amount of undissolved material, cooled to 20° and adjusted to pH 7 by the addition of dilute hydrochloric acid. The dyestuff solution is added dropwise to 1200 parts of a saturated sodium chloride solution and 200 parts sodium chloride are simultaneously introduced into the resultant dyestuff suspension at the same rate as the dyestuff solution is added. The precipitated dyestuff is filtered off with suction and dried at 20° in a vacuum. The dyestuff corresponds to the formula

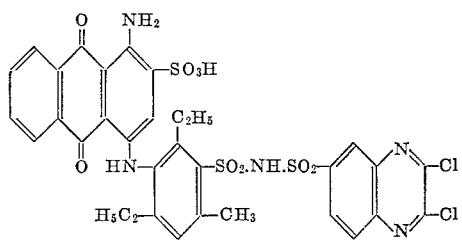

(B) Reactive dyeing on wool.—0.2 part of the dyestuff of Example 3(A) is dissolved in 30 parts water and added to a solution of 470 parts water, 3 parts acetic acid, 1 part of emulsifying polyglycol ether according to published German specification No. 1,041,003 and 0.5 part p-oxybenzyl-N-hexadecylamino polyglycol ether, e.g., according to British patent specification No. 802,642. This dyebath is heated to 40°, 10 parts wool yarn are introduced into the dyebath which is brought to the boil within 20 minutes, and dyeing is continued at boiling temperature for one hour. The dyed wool skein is subsequently rinsed with cold water and dried. A fast blue dyeing is obtained.

Example 4

(A) 21 parts of the sulphonamide prepared according to Example 1(A) are dissolved at 50° in 300 parts water. After adjusting the solution to a pH value of 9–10 by means of a dilute sodium hydroxide solution, 14 parts 2 - chlorobenzothiazole - 6 - sulphochloride prepared according to the instructions of Belgian patent specification No. 611,736, page 13, Example 8, are added and the stated pH value is maintained by the dropwise addition of a 1 N sodium hydroxide solution. Another 7 parts 2 - chlorobenzothiazole-sulphochloride are added and the pH value is further maintained at 9–10.

When the reaction is completed, the mixture is cooled to 20°, filtered and the filtrate adjusted to pH 7 by means of dilute hydrochloric acid. 90 parts sodium chloride are added to the resultant dyestuff solution with vigorous stirring. The precipitated dyestuff is allowed to settle, the supernatant mother liquor is decanted and the dyestuff is finally pressed on a suction filter. It is dried at 20° in a vacuum and corresponds to the formulae

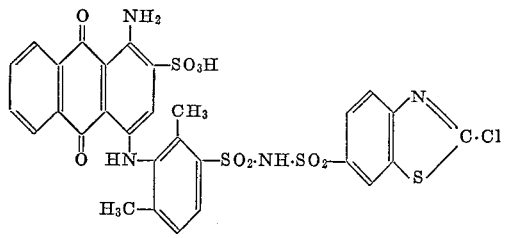

and

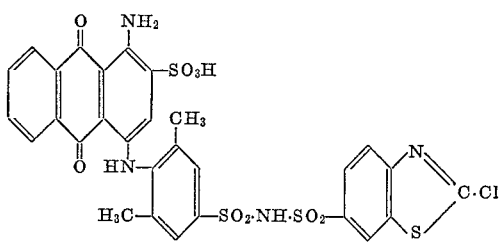

(B) A printing paste is prepared by mixing 40 parts of the dyestuff according to Example 4(A) and 250 parts hot water at 60°, 200 parts urea, 10 parts sodium carbonate and 500 parts alginate thickener. A staple fibre or cotton fabric is printed with this printing paste, the printed material is dried at 80° and fixed by steaming at 101–103° for 8 minutes. The material is subsequently rinsed cold, soaped with boiling, rinsed again and dried. A brilliant reddish blue print is thus obtained on the fabric.

Example 5

(A) 20 parts 1 - amino - 4 - (4'-methyl-2',6'-diethyl-3' - sulphamido) - phenylamino-anthraquinone - 2 - sulphonic acid [prepared in analogy with Example 1(A)] are dissolved at 50° in 500 parts water. After adjusting the solution to a pH value of 9–10 by means of dilute sodium hydroxide solution, 14 parts 2 - chlorobenzothiazole - 6 - sulphochloride are added and the stated pH value is maintained by the dropwise addition of a 1 N sodium hydroxide solution. Another 7 parts 2-chlorobenzothiazole sulphochloride are added and the solution is further kept at pH 9–10.

When the reaction is completed, the mixture is cooled to 20°, filtered and the filtrate adjusted to pH 7 by means of dilute hydrochloric acid. The dyestuff is precipitated from the solution by the addition of 120 g. sodium chloride, allowed to settle, the supernatant solution is decanted and the dyestuff then pressed on a suction filter. It is dried at 20° in a vacuum. The dyestuff corresponds to the formula

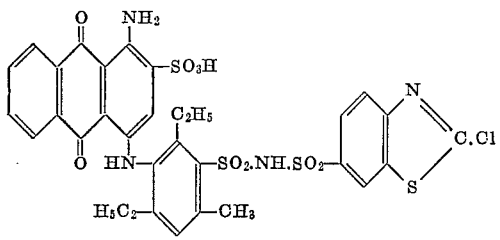

(B) A printing paste is prepared in analogy with Example 4(B) from the dyestuff so obtained. A cotton fabric printed with this paste, dried at 80° and fixed by steaming at 101–103° for 8 minutes, exhibits a brilliant reddish blue print.

Example 6

If Example 1(B) 56.5 parts of 1,4 - dichloro-phthalazine - 6 - sulphochloride are used instead of 56.5 parts of 2,3 - dichloroquinoxaline-6-sulphochloride and otherwise proceeded as indicated, dyestuffs are obtained which correspond to the following formulae

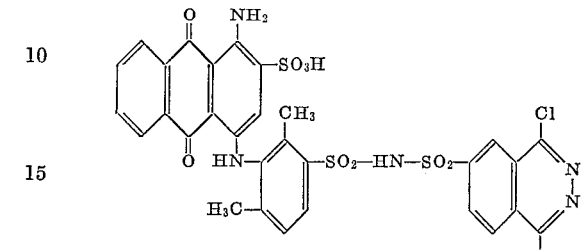

and

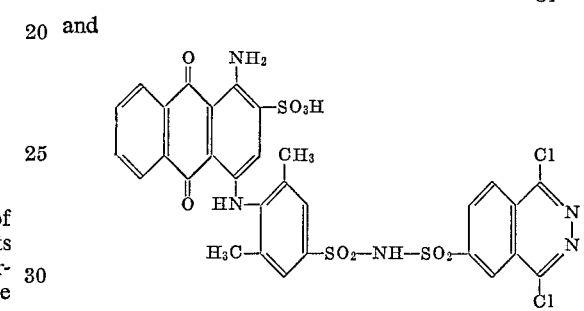

The dyestuff dyes cellulose fabrics, for instance in the padding process described in Example 1(C), brilliant reddish blue shades.

Example 7

9 parts of 1 - amino - 4 - (2'-methyl-6'-chloro-X'-sulphamido) - phenylamino - anthraquinone - 2 - sulphonic acid, prepared according to the method given in Example 1(A), are dissolved at 50° in 350 parts of water. The solution is adjusted by means of sodalye to a pH value of 9 to 9.5. 5.5 parts of 2,3 - dichloroquinoxaline-6-sulphochloride and 1 ml. of chlorobenzene are then added and the pH kept constant by adding dropwise 1 N sodalye. After one hour 10 ml. of aceton are added to the reaction mixture; the reaction is completed after further 1½ hours.

A vigorous stream of air is blown into the reaction mixture and the chlorobenzene thus removed from the dyestuff solution. The hot solution is then treated with 20 ml. aceton, filtered from undissolved parts and cooled down to 20°. After adjusting the pH to 7 with dilute hydrochloric acid the dyestuff solution is added dropwise to 500 ml. of saturated sodium chloride solution. To this solution 80 g. of solid sodium chloride are further added. The precipitated dyestuff corresponds to the formula

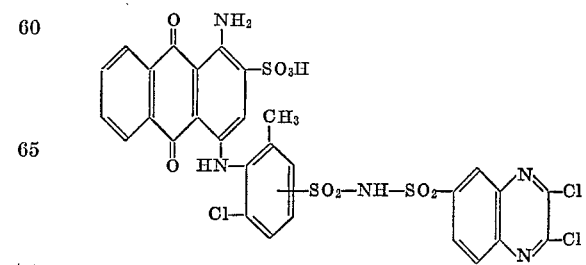

It is filtered with suction and dried at 20° in the vacuum.

The dyestuff dyes cotton, for instance from long bath, as described in Example 2(B) strong reddish blue and clear shades.

We claim:
1. An anthraquinone dyestuff of the formula

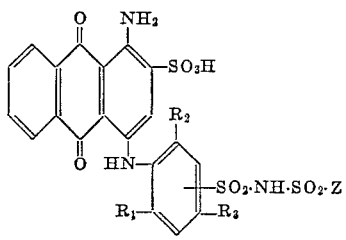

wherein $R_1$ stands for lower alkyl having 1 to 4 carbon atoms or halogen, $R_2$ is a lower alkyl having 1 to 4 carbon atoms, $R_3$ stands for hydrogen or lower alkyl having 1 to 4 carbon atoms, and Z stands for a member of the group consisting of 2-chlorothiazol-1,3-yl-4; 2-chlorothiazol-1,3-yl-5; 2,4-dichloropyrimidin-1,3-yl-5; 2-chlorobenzothiazol-1,3-yl-5 or -yl-6; 2-chlorobenzoxazol-1,3-yl-5 or -yl-6; 2,3-dichloroquinoxalin-yl-6; 2,4-dichloroquinazolin-yl-6 or -yl-7; 1,4-dichlorophthalazin-yl-6; 2-, 3-, or 4 -(4′,5′ - dichloropyridazon - 6′ - yl - 1′) - phenyl; 4-fluoro-3-nitrophenyl-1; 4-chloro-3-nitrophenyl-1;

—CH₂—CH₂—Cl; —CH=CH₂;
—CH₂—CH₂—O—SO₃H; —CH₂—CH₂—SO₂—CH₃;
—CH₂—CH₂—O—SO₂—CH₃;

and

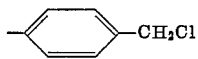

2. An anthraquinone dyestuff of the formula

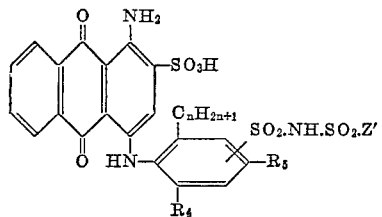

wherein $R_4$ stands for the residue —$C_nH_{2n+1}$, Cl or Br, $R_5$ stands for hydrogen or —$C_nH_{2n+1}$, n stands for the integer 1 or 2 and Z′ stands for 2,3-dichloro-quinoxalinyl-6, 1,4-dichloro-phthalazinyl-6 or 2-chloro-benzthiazolyl-6.
3. The dyestuff of the formula

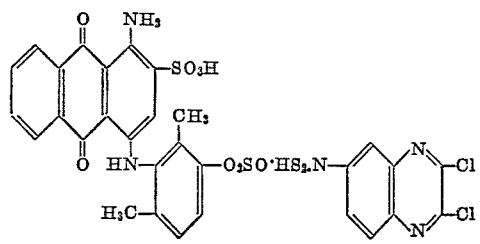

4. The dyestuff of the formula

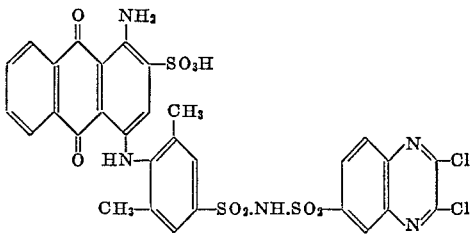

5. The dyestuff of the formula

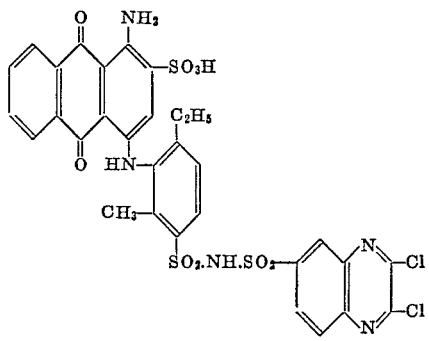

6. The dyestuff of the formula

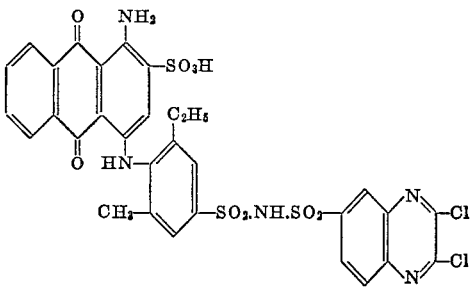

7. The dyestuff of the formula

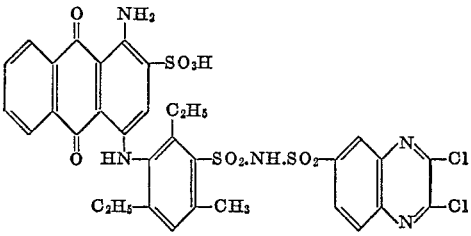

References Cited

UNITED STATES PATENTS 3,134,761  5/1964  Ackermann et al. ____ 260—261
3,184,282  5/1965  Cole et al. _____ 260—262

FOREIGN PATENTS 700,021  12/1964  Canada.

ALEX MAZEL, Primary Examiner
A. M. TIGHE, Assistant Examiner

U.S. Cl. X.R.
8—39; 260—256.5, 262, 303, 307.5, 373, 374